United States Patent [19]
Roberts et al.

[11] 3,859,963
[45] Jan. 14, 1975

[54] FLUIDISED BED COMBUSTORS

[75] Inventors: Alan Gregson Roberts, Dorking; Dennis Malcolm Wilkins, Purley; Malcolm Arthur Wright, Cheltenham, all of England

[73] Assignee: Cool Industry (Patents) Limited, London, England

[22] Filed: Aug. 29, 1973

[21] Appl. No.: 392,551

[30] Foreign Application Priority Data
Sept. 1, 1972  Great Britain.................... 40544/72

[52] U.S. Cl. ............................... 122/4 D, 110/28 J
[51] Int. Cl............................................. F22b 1/02
[58] Field of Search .................... 122/4 D; 110/28 S

[56] References Cited
UNITED STATES PATENTS

| | | | |
|---|---|---|---|
| 3,387,590 | 6/1968 | Bishop................................... | 122/4 |
| 3,397,657 | 8/1968 | Tada.................................. | 110/28 X |
| 3,625,165 | 12/1971 | Ishigaki................................ | 110/28 |
| 3,636,896 | 1/1972 | McLaren............................... | 110/28 |

Primary Examiner—Kenneth W. Sprague
Attorney, Agent, or Firm—Stevens, Davis, Miller & Mosher

[57] ABSTRACT

A fluidised bed combustor has a combustor body in which fuel is burnt and heat extracted in a fluidised bed of particulate material. A container is located adjacent the body and in communication therewith such that material flow may take place between the container and the body. For this purpose a number of communicating ports are provided in the body and extending vertically from these within the container are a number of material transfer ducts. In use, load variation i.e. heat output variation is achieved by material transfer between the container and the combustor body; this is facilitated by the provision of the transfer ducts when transfer is desired from the body to the container as the material flow is not adversely effected by the pressure head in the container. To this end the ducts extend within the container to a level above the expected material level therein. For transfer from the container to the body an air permeable grid is conveniently provided adjacent the communicating ports.

7 Claims, 1 Drawing Figure

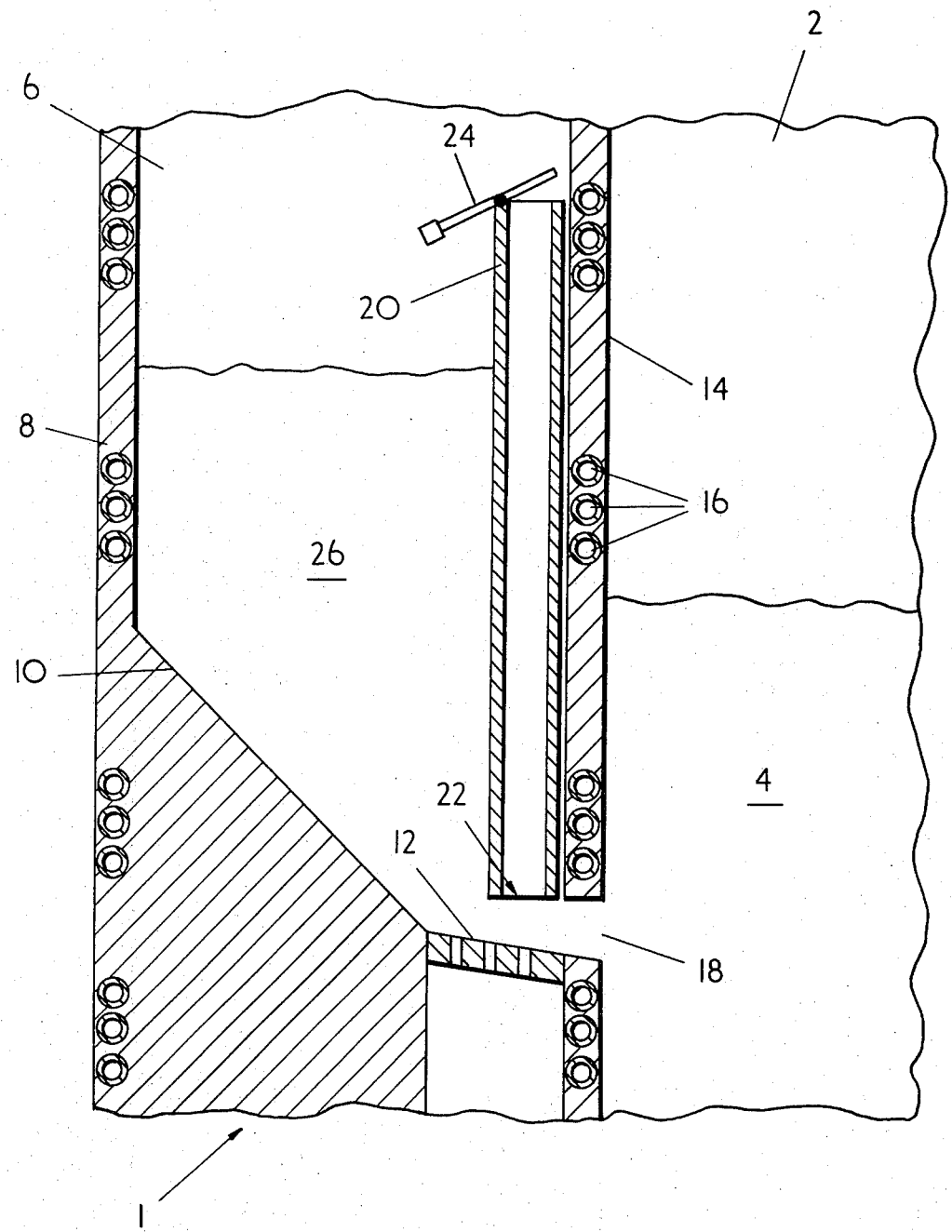

FLUIDISED BED COMBUSTORS

This invention concerns improvements in and relating to fluidised bed combustors.

In particular the invention concerns itself with the provision of means whereby the heat output of a fluidised bed combustor can more readily be regulated.

In a fluidised bed combustor the rate of heat input to the bed from combustion of the fuel must equal the sum of the rates of heat extraction from the bed, i.e. through the walls of the combustor, by heat exchange surfaces immersed in the bed, by radiation from the top surface of the bed, and the difference between the heat content of the gases leaving the bed and of air supplied to it. The temperature range over which the bed can be operated is limited in that the temperature must be high enough for satisfactory combustion, with coal as the fuel probably not lower than about 750°C., and lower than that at which particles forming the bed may sinter and form agglomerates, or at which undesirable constituents of the ash may be volatilised and this temperature may be between 850° and 900°C.

The heat transfer coefficient between the bed and heat exchange surfaces immersed in it depends mainly on the size grading of the bed material. It is dependent to a lesser extent on surface and bed temperatures and the spacing of heat exchange surfaces, but, provided that the bed is fully fluidised, it is almost independent of fluidising velocity and pressure. Thus the scope for varying the rate of heat transfer to surfaces in the bed is limited. With an air/fuel ratio giving a normally acceptable percentage of excess air the heat to be extracted from the bed represents at least 65 percent of the heat liberated in the bed, and this percentage rises if the combustion air is preheated either in an air preheater or by compression.

One method of varying the heat output from a fluidised bed combustor hitherto proposed involves the transfer of bed material between the combustor, containing the bed, and a container separate from or adjacent the combustor. This transfer of material has the effect of submerging more or less tube surface in the bed, thus altering the overall heat transfer coefficient to the tube surface, since the heat transfer coefficient to the tubes immersed in the bed is many times greater than the tubes exposed above the bed.

Hitherto such transfer has been effected mechanically by, for example, a screw conveyor extending into the bed and to the container, the direction of rotation determining the direction of material transfer. In view of the high temperatures associated with a fluidised bed combustor the mechanical problems attaching to the use of such a conveyor render this type of material transfer disadvantageous.

An alternative way in which transfer may be effected is by applying a pressure differential to the material in the container and the bed within the combustor. Thus if it is required to reduce load, material is transferred from the combustor to the container and this is achieved by reducing the pressure in the container to a value lower than that in the combustor. In the alternative, if it is desired to increase load, material from the container is transferred to the combustor and in this instance the pressure differential must be reversed. This reversal may advantageously be effected by local fluidisation of material in the container in the region of material transfer ports interconnecting the combustor and the container.

It has been found that, by utilising the pressure differential mode of material transfer, material movement from the container to the combustor presents no difficulties. However the transfer of material from the combustor to the container has been found to be more difficult. The apparent reason for this is that when the pressure head in the container reaches a certain value transfer of material from the combustor ceases because of the loss of the correct pressure differential and possibly because of defluidisation in the container.

It is therefore an object of the invention to provide a fluidised bed combustor which seeks to overcome the difficulties associated with pressure differential material transfer.

For this purpose according to the invention a fluidised bed combustor includes a combustor body, a container adjacent the combustor body, a number of ports inter communicating the container and the combustor body, and a number of material transfer ducts each extending from a region adjacent an associated port and extending within the container to a location above the port.

Preferably each duct extends vertically or substantially vertically within the container and terminates in a non-return valve, e.g. a flap valve, at a location above its associated port, the location being determined by the maximum level of material envisaged to be accommodated in the container. The location of the relatively upper terminal end of the duct being above such maximum level.

The container has a base a part of which adjacent each port is conveniently provided with a gas-permeable grid which enables, in use, local fluidisation of the material contained therein for the purpose of assisting or effecting material transfer from the container to the combustor body.

The combustor body may otherwise be of conventional form and thus comprises a support grid for a fluidised bed, an inlet for a fluidising medium located below the grid, a fuel inlet situated above the grid, and an exhaust gas outlet. Heat exchange means conveniently in the form of tubing are located within the combustor body above the grid such that in use they are immersed or partially immersed within the fluidised bed depending on the heat output required.

By way of example only, one form of fluidised bed combustor is described below with reference to the accompanying drawing which is a side sectional elevation of the fluidised bed combustor.

Referring to the drawing a fluidised bed combustor, generally indicated by the reference numeral 1, includes a combustor body 2 having located in a lower region thereof a support grid (not shown) for supporting a fluidised bed 4 of particulate material. An array of heat exchange tubes (not shown) is located within the body 2, the tubes being provided for the flow of a heat exchange medium through the bed to extract heat therefrom. The body 2 is also provided with conventional features which include a fuel inlet, an exhaust gas outlet and a fluidising medium inlet none of which is illustrated in the drawing for the sake of clarity.

Adjacent the combustor body 2 is a container 6, which in this embodiment is integral with the body 2. The container 6 is provided as a reservoir for material which in use may be removed from the bed 4; the container 6 comprises outer walls, only wall 8 of which is shown, a sloping base 10, and a number of inclined gas permeable sections 12 forming part of the base 10 adjacent the combustor body 2. The common intervening wall 14 between the body 2 and container 6 incorporates a plurality of heat exchange tubes 16; the wall 14 is provided with a number of communication ports 18 which are formed between tubes 16 adjacent the permeable section 12. Only one of the ports 18 is shown but it will be appreciated that more than one may be provided at generally the same level as that shown and at spaced locations longitudinally of the combustor body 2 i.e. into the plane of the drawing.

A number of material transfer ducts 20, corresponding to the number of ports 18, is provided and each duct 20 is positioned vertically within the container 6 adjacent the wall 14. The lower open end 22 of each duct 20 is positioned such as to be level with the upper edge of its associated port 18; each duct 20 terminates in a non-return valve e.g. a flap valve, the location of which valve 24 above the associated port 18 being determined by the expected maximum level of material 26 within the container 6. As can be seen the location of the or each valve 24 is above the surface of the material 26.

In the operation of the fluidised bed combustor above described the bed 4 comprises discrete particulate material, either inert or catalytic, into which fuel, which may be solid, gaseous or liquid, is introduced for combustion. Fluidisation of the bed 4 is effected by the introduction of a combustion sustaining fluid, e.g. air, through the support grid (not shown). The heat generated by the fuel combustion is extracted from the bed by a heat exchange medium passing through the tubes (not shown) located within the combustor body above the grid. For maximum heat output the tubes are fully immersed in the bed to take advantage of the highly advantageous heat transfer coefficient afforded by the fluidised bed combustion technique. However, when it is desired to reduce heat output the level of material in bed 4 has to be reduced. To effect this reduction a pressure differential is applied to the container 6 and body 2 such that the pressure $P_1$ in the body 2 is greater than the pressure $P_2$ in the container 6. With the application of this pressure differential material is transferred from bed 4 into the container via the ports 18. At this condition material from bed 4 passes through ports 18 onto the base 10 of the container 6 and thus into the container. If the pressure head of material 26 in the container 6 is such as to constitute resistance to material transfer, the material from bed 4 passes through the ports 18 and thence into ducts 20 where it is carried upwardly therethrough because of the existing pressure differential. Upon reaching the valves 24 of the ducts 20 the material passes the valves and falls onto the material 26 already in the container. The provision of ducts 20, therefore, affords means whereby material from bed 4 can, at any desired regulated heat output, be transferred to the adjacent container 6 without encountering the problem of transfer hitherto experienced.

In the reverse operation of increasing heat output from bed 4, material 26 from container 6 is required to be reintroduced to the bed 4. To this end a pressure differential in the opposite sense to that already described is applied to the combustor and a fluidising medium is introduced through the permeable section 12 of the container base 10. The pressure $P_2$ then becomes greater than pressure $P_1$ and because of the inclination (as shown in the drawing) of the sections 12 fluidised material passes down those sections through the ports 18 and into the bed 4 within body 2. The transfer of material in this way causes the level of material in bed 4 to increase and as a consequence the heat output therefrom to rise. Material cannot enter ducts 20 because of the provision of non-return valves 24.

It is to be appreciated that the ducts 20 rather than being unitary may be formed of channels having adjacent regions of the wall 14 as complementary guide surfaces. In addition the wall 14 may be formed of tubing.

We claim:

1. A fluidised bed combustor including a combustor body, a container adjacent the combustor body, a common intervening wall interjacent the combustor body and the container, a number of communicating means defined in said wall and intercommunicating the container and the combustor body, and a number of material transfer ducts each extending within the container from an associated communicating means and terminating above the communicating means.

2. A combustor according to claim 1 in which the container has a base a part of which adjacent each communicating means is provided with a gas-permeable grid.

3. A combustor according to claim 1 in which each material transfer duct extends substantially vertically within the container.

4. A combustor according to claim 1 in which the common intervening wall incorporates a plurality of heat exchange tubes.

5. A combustor according to claim 1 in which the communicating means are in the form of ports.

6. A combustor according to claim 1 in which a non-return valve is provided in each duct remote from its associated communicating means.

7. A fluidised bed combustor including a combustor body, a container adjacent the combustor body to hold material transferred from the combustor body, a wall between the combustor body and the container, at least one communicating means in said wall intercommunicating the container and the combustor body and defining a passage sloping downwardly toward the combustor body, at least one material transfer duct extending upwardly from a communicating means and terminating within the container above the level of the material in the container.

* * * * *

UNITED STATES PATENT OFFICE
CERTIFICATE OF CORRECTION

Patent No. 3,859,963          Dated January 14, 1975

Inventor(s) Alan Gregson ROBERTS et al

It is certified that error appears in the above-identified patent and that said Letters Patent are hereby corrected as shown below:

In the Heading, under Assignee,
    Assignee should read:    Coal    Industry (Patents) Limited Signed and sealed this 1st day of April 1975.

(SEAL)
Attest:

RUTH C. MASON
Attesting Officer

C. MARSHALL DANN
Commissioner of Patents
     and Trademarks